United States Patent [19]
Filsinger

[11] 3,783,225
[45] Jan. 1, 1974

[54] PRODUCTION OF CONICAL BORES

[76] Inventor: Werner Filsinger, Baumelsgewann 3, Heidelberg, Germany

[22] Filed: Aug. 25, 1972

[21] Appl. No.: 283,713

[52] U.S. Cl.............. 219/69 V, 74/86, 144/93 R, 248/184, 269/71, 408/89
[51] Int. Cl............................................. B23p 1/12
[58] Field of Search.................... 74/86; 144/93 A, 144/93 R, 96; 219/69 E, 69 M, 69 V; 248/184, 284; 269/71; 408/46, 87, 89, 90

[56] References Cited
UNITED STATES PATENTS

| | | | |
|---|---|---|---|
| 2,773,968 | 12/1956 | Martellotti et al.............. | 219/69 V |
| 2,651,975 | 9/1953 | Soloff............................... | 408/89 X |
| 2,404,201 | 7/1946 | Wineman.......................... | 74/86 X |
| 1,519,715 | 12/1924 | Altorfer............................ | 74/86 X |
| 2,699,502 | 1/1955 | Hohl et al......................... | 74/86 X |
| R26,970 | 10/1970 | Bentley et al.................... | 219/69 V |

FOREIGN PATENTS OR APPLICATIONS 972,889  10/1959  Germany......................... 219/69 V Primary Examiner—R. F. Staubly
Attorney—Carroll B. Quaintance et al.

[57] ABSTRACT

Method for producing a conical bore in a work-piece, in which the work-piece is suspended on gimbals and is wobbled during the boring process. Advantageously the production of the bore is by spark erosion. The invention also extends to a work-piece support in which a clamping table is suspended on gimbals for rotation about at least two axes. An eccentric device is used to move the clamping table.

9 Claims, 4 Drawing Figures

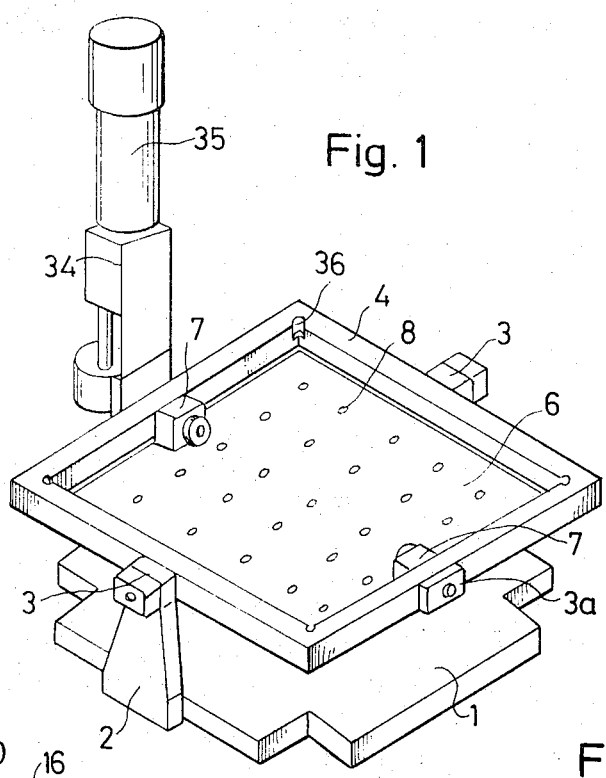

PRODUCTION OF CONICAL BORES

The invention relates to a method for producing conical bores, in particular by spark erosion, and to a work-piece support for carrying out this method.

It is known to produce bores of complicated shape in work-pieces by spark erosion. Attempts have also been made to produce such bores with a slight conicity, as required, for example, in die plates for cutting dies. In a known machine, which operates with a thin wire electrode and which saws the bore out to a certain extent, the wire is guided such that it follows the prescribed curve above the upper edge of the work-piece whereas below the work-piece it makes an additional circulating motion, so that in this section, if the translatory motion is disregarded, the wire describes a conical surface. However, the apex of such a cone does not lie exactly in the surface of the work-piece, due to which there results an unnecessary widening out of the aperture, which must be taken into consideration. In addition, on account of the slight diameter of the electrode the machine can only operate at a limited, low speed.

Attempts with conical electrodes have not succeeded as it is difficult to produce conical electrodes, since it is the smaller of the electrode surfaces for which the accuracy of size and shape is required. Conical cutting of the electrodes is therefor expensive. Moreover, when eroding with an electrode of this type it is difficult to ascertain exactly when the work-piece is complete, because if the erosion is interrupted prematurely a burr remains, whereas if the operation is continued too long, after penetration of the electrode the opening is enlarged.

Conical bores have already been produced by continuously increasing the current intensity supplied to the electrode in uniform manner. However with this method the surface of the penetration becomes rougher with increasing enlargement, so that under certain circumstances a finishing operation becomes necessary.

It is the object of the invention to provide a method which facilitates the production of bores, in particular by spark erosion, with accurately adjustable conicity up to at least 2° in the one operation, the wall of the bore being required to have uniform smoothness in each plane of cross-section.

It is a further object of the invention to provide a device, in particular a work-piece support, for carrying out this method.

According to the invention the method consists in that the work-piece is suspended on gimbals and during the boring operation moves with a wobbling action.

The device for carrying out this method consists of a work-piece support, whose clamping table is located in a gimbal suspension with at least two axes of rotation and which is moved by an associated eccentric device. According to the preferred embodiment of the invention the axes of rotation are located in the same horizontal plane. The axes of rotation should appropriately be located at the level of the upper or lower edge of the work-piece.

The eccentric device is preferably located below the intersection of the cardan axes. This eccentric device can have adjustable eccentricity.

It has proved desirable that the pivot pins of the axes of rotation are located at the same distance from the intersection of the latter.

In a further embodiment of the invention it is proposed that the pivot pins and the connecting pins of the eccentric device have a conical tip and can be adjusted in conical bores by set screws located therebehind, and that they project into sliding bearings with the tip of the pin having corresponding conicity, which bearings have an oil hole lying opposite the tip of the pin and are sealed by an O-ring at the cylindrical part of the pin.

The adjustability of the eccentricity of the eccentric device is achieved in that the eccentric bearing can be moved at right angles to the longitudinal axis of the eccentric device by an adjusting screw held in position by a screw socket. Finally it is proposed that at the level of the axes of rotation the device has guides and/or supports for the location of a template for setting up the work-piece.

According to the method of the invention the work-piece is suspended on gimbals in such a way that the cardan axes of the suspension coincide with the upper or lower surface of the work-piece. Thus the centre of the bore to be produced should lie as close as possible to the intersection of the cardan axes. During the boring operation the work-piece is then moved with a wobbling action such that the vertical to the plane of the cardan axes at the intersection of these axes describes a conical surface.

If, as is the case for example in the manufacture of die plates, a slight conicity, in the range of minutes, is to be provided, then a comparatively large lateral tolerance of the ideal work-piece arrangement is possible. In practice, the resulting distortion of profile then still lies within the $\mu$ - range and thus within the permitted tolerance.

The invention will now be further described by way of example with reference to the drawings, in which:

FIG. 1 is a general perspective view of one embodiment of work-piece support according to the invention, FIG. 2 is a vertical section through the support passing through a cardan axis, FIG. 3 shows one of the points of suspension of the gimbal mounting in section, FIG. 4 shows the arrangement of the eccentric in the eccentric device in section.

The work-piece support (FIG. 1) consists of a base plate 1 with two opposed supports 2 located at the centres of the sides, and bearings 3 for a pivoting frame 4 mounted on pivot pins 5. On its free sides, the frame 4 has bearings 3a corresponding to the bearings 3, in which are likewise mounted gimbals 7 secured to the clamping table 6. As is customary the clamping table 6 has uniformly distributed tapped holes 8 for securing the work-piece.

It has been shown that in order to avoid distortion of profile it is necessary to locate the bearings at exactly the same distance from the intersection of the axes of rotation. However, errors which occur can also be counteracted by the provision of more than two axes of rotation and a corresponding number of pivoting frames, as well as, if necessary, by the provision of axes of rotation in different planes. The additional expense necessary for this is only suitable for certain special cases, in particular when a comparatively great conicity of the bore is required.

Located at the centre of the clamping table 6, is a bearing 3b with a pivot pin 5a which engages in an eccentric device 9 located below the clamping table 6. The bearings 3, 3a and 3b are constructed identically and consist of a bore 10 in one of the parts to be connected, whose outer part widens out and has an internal thread 11. In this thread behind the bolt 5 there is located a set screw 12. The pin 5 has a conical tip 13 and projects with its front end into a blind bore 14, corresponding to its shape, in the other part of the part to be connected. Opposite the tip 13 of the pivot pin 5, the blind bore 14 has an oil hole 15. A groove which receives an O-ring 16 is also present in the blind bore 14.

Such a construction of the swivel bearing is necessary since in the case of the production of bores by spark erosion the entire support is in a dielectric which is constantly contaminated by erosion products; the latter can for example be removed by suction during the operation; nevertheless a certain residual concentration of erosion products in the dielectric cannot be avoided. Therefore an optimum seal of the bearings is necessary. On the other hand the friction and erosion of the bearing surfaces is not of crucial significance on account of the minimal movement.

In addition these bearings have the advantage that by means of appropriate adjustment of the set screws 12 a simple adjustment of the clamping table 6 is possible.

The eccentric device 9 consists of the actual eccentric 17 which is secured to be longitudinally displaceable in a recess 18 in the cover plate 19. This can occur for example by means of bars 20 which slide in grooves 21 in the cover plate 19. As already described, the eccentric 17 has a bearing 3b, in which the pivot pin 5 of the clamping table 6 engages. One end of the eccentric 17 has an axial bore 22 with a screw thread 23. In this and in the opposite bore 24 in the cover plate 19 there is inserted a screw 25, whose head 26 is located in an extension of the bore 23. Behind it, as far as the outlet end, the bore 23 is provided with a screw thread 27 in which a screw socket 28 is inserted. In this way the screw 25 is rotatably secured in position. Since it is accesible from outside, the desired eccentricitiy can be adjusted by means of a tool.

The cover plate 19 is rigidly connected to a shaft 29, which has a sprocket wheel 30 at its free end. The shaft 29 is located in a bearing bush 31 with bearings 32 and is locked to prevent axial play by a ring 33. The bearing bush 31 is rigidly connected to the cover plate 1, (not shown). It must obviously be sealed as well to prevent the possible penetration of erosion products as is the case with the bearings 3, 3a and 3b. The sprocket wheel 30 is connected to the output shaft of the transmission unit 34 of an electric motor 35 by a chain.

In addition, on the frame 4 the support has for example support surfaces 36 for a template, which can be placed at the level of the axes of rotation for the accurate lateral orientation of the work-piece. If the work-piece is to be clamped such that its lower surface lies at the level of the axes of rotation, then supports for the template must be provided at an appropriately higher level (not shown). However, as previously mentioned an accurate centering of the work-piece is not generally necessary.

In order to adjust the eccentric so as to obtain the desired conicity of the bore, it is adjusted approximately; the increase in height at one edge of the clamping tables is measured with an instrument and according to the result a further adjustment is undertaken. Now the work-piece is clamped such that its upper or lower surface lies at the level of the plane containing the axes of rotation. In this case it is often an advantage to place thereunder a base plate of corresponding thickness, which corresponds approximately to the shape and size of the work-piece, which however has a continuous central aperture, whose dimensions are greater than those of the bore to be produced. If such a plate also has a lateral tap hole for the connection of a suction tube, then during the erosion, the erosion products can be continuously removed by suction from the operating region. After setting up the electrodes and filling up with dielectric fluid the support installed in the electrolyte reservoir of a spark erosion machine is ready for operation.

During the erosion, with the exception of the motor and the reduction gearing, the work-piece support is fully immersed in the dielectric fluid. After switching on the support motor erosion can be carried out in the normal manner and at the customary speed. The frequency of the wobbling action lies within the range of seconds or tens of seconds. Somewhat more machining time is necessary than when producing cylindrical bores, since on account of the conicity comparatively more material has to be removed.

In the manufacture of die plates the process may also be such that firstly with a stationary support and at an increased speed a cylindrical bore is produced, a comparatively rough wall occurring, and subsequently the conicity is produced in a second machining operation. This has the advantage that the second time the erosion does not need to be exactly up to the cut edge, since in this region a short piece of cylindrical wall can remain.

A similar effect can be achieved if the work-piece is clamped such that one of its surfaces does not lie exactly in the plane of the axes of rotation, but lies in an adjacent parallel plane.

The method according to the invention and the work-piece support necessary therefor are characterised in that without any great additional expense bores can be produced with a conicity of up to approximately 2° with surprisingly high accuracy. The invention was described in particular with reference to the example of the manufacture of die plates; it is however in no way limited to this application. On the contrary it is to be expected that the possibility of the simple manufacture of conical bores will facilitate the use of the technique of spark erosion in applications in which it could never be used previously. However, the invention is also not limited to the application of spark erosion, since the method can be used in similar manner for the production of perforations by means of mechanical machining by boring, milling or grinding.

What is claimed is:

1. An apparatus for producing a conical depression of a given shape in a work piece comprising:
   A. a spark erosion electrode of a given shape,
   B. a clamping table rotable about two axes which intersect each other at right angles in a point of intersection and define a plane,
   C. means for clamping a work piece on the clamping table with the point of intersection lying closely adjacent to the upper or lower surface of the work piece,
   D. means for rocking the clamping table simultaneously an equal amount about each axis while applying current to the spark erosion electrode,
   E. means for feeding the electrode transversely toward the plane defined by the axes.

2. Apparatus according to claim 1, wherein the clamping table is suspended on gimbals and can be moved by an eccentric device associated with it.

3. Apparatus according to claim 2 wherein the eccentric device is located below the intersection of the axes.

4. Apparatus according to claim 2 wherein the eccentric device is adjustable to vary its eccentricity.

5. Apparatus according to claim 2 wherein pivot pins at the axes of rotation are located at the same distance from the intersection of the axes.

6. Apparatus according to claim 2 wherein the pivot pins and the connecting pins of the eccentric device have a conical tip and can be adjusted in bores by set screws located therebehind, the tip of the pin projecting into sliding bearings of corresponding conicity, which bearings have an oil hole opposite the tip of the pin and are sealed at the cylindrical part of the pin by an O-ring.

7. Apparatus according to claim 2 wherein the eccentric is displaceable at right angles to the longitudinal axis of the eccentric device by means of a set screw held in its position by a screw socket.

8. Apparatus according to claim 2 wherein at the level of the axes of the rotation, guides and/or supports for locating a template for setting up the work-piece are provided.

9. A process for producing a conical depression of a given shape in a work piece comprising the steps of:
   I. providing a spark erosion electrode of a given shape above a clamping table,
   wherein the clamping table is rotable about two axes which intersect each other at right angles in a point of intersection and define a plane,
   II. clamping the work piece on the clamping table with the point of intersection lying closely adjacent to the upper or lower surface of the work piece,
   III. simultaneously rocking the clamping table an equal amount about each axis while applying current to the spark erosion electrode,
   IV. feeding the electrode transversely toward the plane defined by the axes thereby contacting the work piece and creating a depression therein.

* * * * *